US012032791B2

(12) United States Patent
Gruhlke

(10) Patent No.: US 12,032,791 B2
(45) Date of Patent: Jul. 9, 2024

(54) VERIFICATION OF A USER INPUT OF A USER INTERFACE

(71) Applicant: QUALCOMM Incorporated, San Diego, CA (US)

(72) Inventor: Russell Gruhlke, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/333,408

(22) Filed: May 28, 2021

(65) Prior Publication Data
US 2022/0382410 A1 Dec. 1, 2022

(51) Int. Cl.
*G06F 3/042* (2006.01)
(52) U.S. Cl.
CPC .. *G06F 3/0421* (2013.01); *G06F 2203/04108* (2013.01)
(58) Field of Classification Search
CPC ............... G06F 3/0421; G06F 2203/04108
See application file for complete search history.

(56) References Cited

U.S. PATENT DOCUMENTS

| 2005/0199876 | A1* | 9/2005 | Matsumoto | G06F 3/0421 257/64 |
| 2006/0274056 | A1* | 12/2006 | Saravanan | G01V 8/20 345/175 |
| 2006/0290674 | A1* | 12/2006 | Blythe | G06F 3/0393 345/166 |
| 2007/0274056 | A1* | 11/2007 | Schmitt | H05K 3/0061 29/842 |
| 2008/0012835 | A1* | 1/2008 | Rimon | G06F 3/04186 345/173 |
| 2008/0122792 | A1* | 5/2008 | Izadi | G06F 3/04883 345/173 |
| 2008/0259052 | A1* | 10/2008 | Lin | G06F 3/0421 345/175 |
| 2009/0058832 | A1* | 3/2009 | Newton | G06F 3/0421 345/175 |
| 2009/0228828 | A1* | 9/2009 | Beatty | G06F 3/0488 715/786 |
| 2011/0032214 | A1* | 2/2011 | Gruhlke | G06F 3/0421 359/291 |

(Continued)

FOREIGN PATENT DOCUMENTS

KR 20120057146 A * 6/2012

OTHER PUBLICATIONS

Machine translation of KR20120057146A (Year: 2012).*
Gruhlke R., et al., "A Novel Three Dimensional User Interface Technology", (Jun. 2015), 4 Pages, Jul. 29, 2015.

*Primary Examiner* — Patrick N Edouard
*Assistant Examiner* — Joseph P Fox
(74) *Attorney, Agent, or Firm* — QUALCOMM Incorporated

(57) ABSTRACT

In some aspects, a device may cause a light emitter to emit light waves within a light plane that is parallel to a surface of an input component. The device may receive, from a sensor arrangement, a measurement associated with the light waves in the light plane. The measurement may be indicative of an intended input of a user. The device may perform an action that is associated with a user input of the input component based at least in part on the intended input. Numerous other aspects are described.

30 Claims, 7 Drawing Sheets

(56) References Cited

U.S. PATENT DOCUMENTS

| | | | |
|---|---|---|---|
| 2011/0163998 A1* | 7/2011 | Goertz | G06F 3/042 345/175 |
| 2011/0186718 A1* | 8/2011 | Tanaka | G01D 5/34 250/231.1 |
| 2013/0021302 A1* | 1/2013 | Drumm | G06F 3/0421 345/175 |
| 2015/0109258 A1* | 4/2015 | Chen | G06F 3/0428 345/175 |
| 2015/0364107 A1* | 12/2015 | Sakariya | G06F 3/042 345/82 |
| 2015/0378515 A1* | 12/2015 | Powell | G06F 3/0421 345/175 |
| 2017/0038861 A1* | 2/2017 | Maekawa | G07F 9/0235 |
| 2017/0287976 A1* | 10/2017 | Yanagita | H01L 27/14623 |

\* cited by examiner

VERIFICATION OF A USER INPUT OF A USER INTERFACE

FIELD OF THE DISCLOSURE

Aspects of the present disclosure generally relate to user interfaces and, for example, to verification of a user input of a user interface.

BACKGROUND

Sensors are used within user devices for various purposes. Such sensors may be used to sense one or more characteristics associated with the user device. Such characteristics may include one or more characteristics associated with a user input and/or an environment of the user device. For example, one or more sensors may be configured to detect whether a user is present, detect motion, measure ambient lighting, detect a position of an object contacting a touch screen of the user device, and/or the like.

SUMMARY

In some aspects, a method comprises causing, by a device, a light emitter to emit light waves within a light plane that is parallel to a surface of an input component; receiving, by the device and from a sensor arrangement, a measurement associated with the light waves in the light plane, wherein the measurement is indicative of an intended input of a user; and performing, by the device, an action that is associated with a user input of the input component based at least in part on the intended input.

In some aspects, a device includes one or more memories, and one or more processors, coupled to the one or more memories, configured to cause a light emitter to emit light waves within a light plane that is parallel to a surface of an input component; receive, from a sensor arrangement, a measurement associated with the light waves in the light plane, wherein the measurement is indicative of an intended input of a user; and perform an action that is associated with a user input of the input component based at least in part on the intended input.

In some aspects, a non-transitory computer-readable medium storing a set of instructions includes one or more instructions that, when executed by one or more processors of a device, cause the device to cause a light emitter to emit light waves within a light plane that is parallel to a surface of an input component; receive, from a sensor arrangement, a measurement associated with the light waves in the light plane, wherein the measurement is indicative of an intended input of a user; and perform an action that is associated with a user input of the input component based at least in part on the intended input.

In some aspects, an apparatus includes means for causing a light emitter to emit light waves within a light plane that is parallel to a surface of an input component; means for receiving, from a sensor arrangement, a measurement associated with the light waves in the light plane, wherein the measurement is indicative of an intended input of a user; and means for performing an action that is associated with a user input of the input component based at least in part on the intended input.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
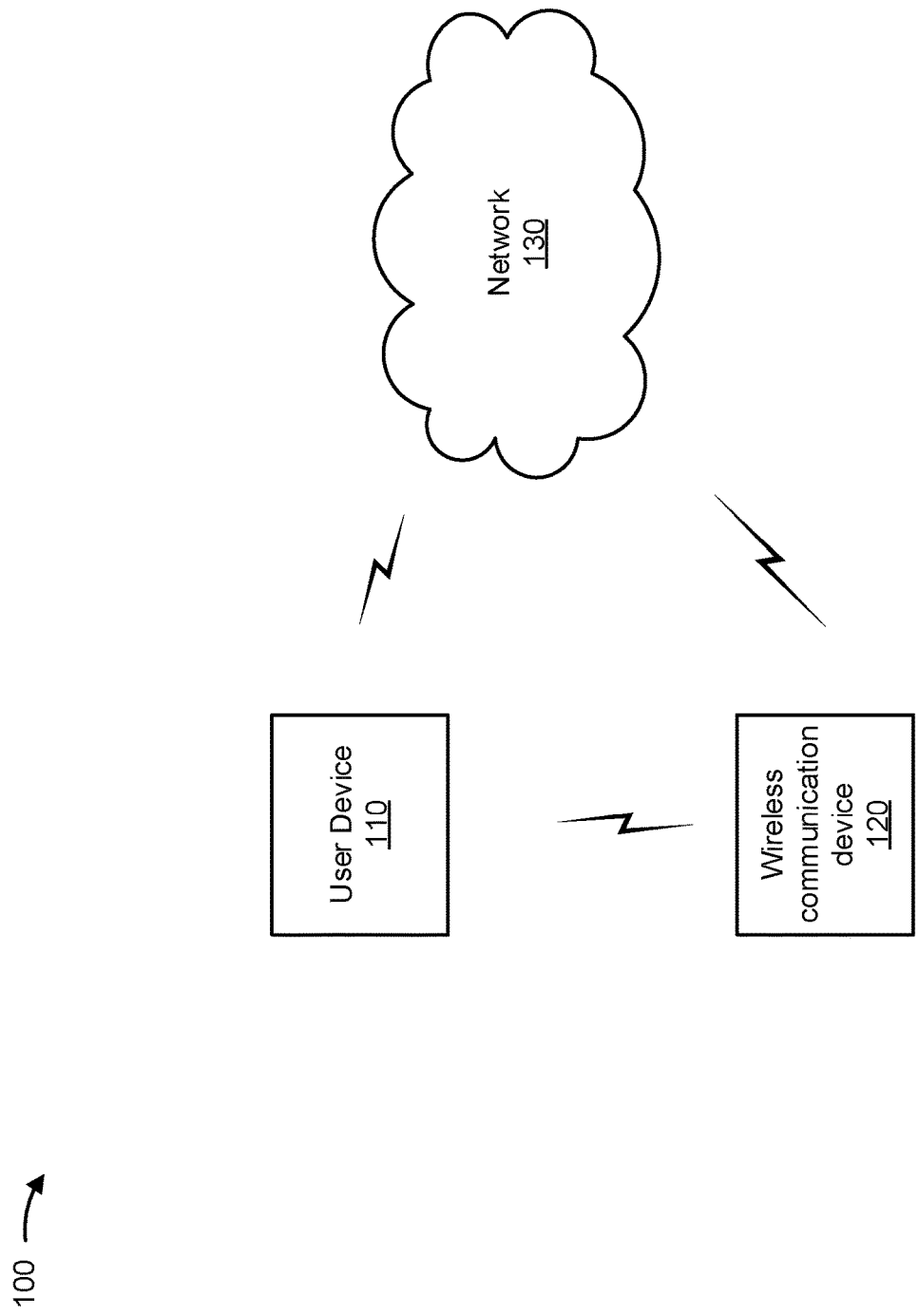
FIG. 1 is a diagram illustrating an example environment in which systems and methods for verification of a user input of a user interface described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In many instances, a user device (e.g., a user equipment, a smartphone, a tablet computer, an automated teller machine (ATM), and/or the like) may include a touch screen that utilizes a capacitive touch sensor to detect an input corresponding to an object (e.g., a finger) contacting the touch screen and/or moving across the touch screen in a particular pattern. The capacitive touch sensor may provide a measurement and/or information that can be analyzed to detect and/or identify a fingerprint of a user, a location at which a finger contacts the touch screen, a movement of a finger across the touch screen in a particular pattern, and/or the like. However, such capacitive touch sensors may be ineffective when the user's finger is wet (e.g., includes droplets of water, sweat, or other liquids) and/or when the user is wearing gloves, due to the presence of a liquid and/or the gloves affecting the measured capacitance of the capacitive touch sensor.

Further, a user may have difficulty touching the touch screen at an intended location and/or moving a finger in a particular pattern across the touch screen due to movement of the user and/or the user device, a physical condition of the user, a size of the user's finger, and/or the like preventing the user from accurately placing a finger at a desired location and/or causing the user's finger to come out of contact with the touch screen (e.g., as the user attempts to move a finger across the touch screen in a particular pattern). Additionally, contacting the touch screen with a finger may result in the transmission of bacteria, viruses, infectious diseases, and/or the like. For example, a user device, such as an ATM machine, may include a touch screen that is utilized by tens, hundreds, or thousands of different people, thereby enabling germs, infectious disease, and/or the like to be transmitted via the touch screen.

Some aspects described herein may enable a user device to detect a touch input (e.g., a finger touching a touch screen) without requiring a user to physically touch a surface of the touch screen. For example, a user device may cause a light emitter to emit light waves within a light plane that is parallel to a surface of an input component (e.g., a touch screen). The user device may receive, from a sensor arrangement, a measurement associated with the light waves in the light plane. The measurement may be indicative of an intended input of a user. The user device may perform an action that is associated with a user input of the input component based at least in part on the intended input. For example, the user device may highlight or otherwise indicate an icon and/or an area of the input device corresponding to the intended input of the user, the user device may perform an action associated with the intended input, and/or the like.

In this way, the user device may detect an input intended by a user and/or perform an action associated with the intended input without requiring the user to physically contact the input component. By not requiring the user to physically contact the input component, the user device may detect the user input when the user's finger is wet and/or when the user is wearing gloves. Further, by highlighting or otherwise indicating an icon and/or an area of the input device corresponding to the intended input of the user, the user device may enable the user to adjust a position, a direction of travel, and/or the like of the user's finger thereby preventing the user device from performing an action that the user does not intend the user device to perform. Prevention of the user device from performing an action that the user does not intend to perform may conserve computing resources (e.g., processing resources, memory resources, communication resources, and/or the like) that would have otherwise been utilized by the user device to perform the unintended action, undo the unintended action, correct the unintended action, and/or the like.

FIG. 1 is a diagram illustrating an example system 100 in which an input component described herein may be implemented, in accordance with various aspects of the present disclosure. As shown in FIG. 1, system 100 may include a user device 110, a wireless communication device 120, and/or a network 130. Devices of system 100 may interconnect via wired connections, wireless connections, or a combination of wired and wireless connections.

User device 110 includes one or more devices capable of including one or more input components described herein. For example, user device 110 may include one or more devices capable of receiving, generating, storing, processing, and/or providing information associated with one or more sensors described herein. More specifically, user device 110 may include a communication and/or computing device, such as a user equipment (e.g., a smartphone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), an ATM machine, a payment terminal, a kiosk, an interactive display device, or a similar type of device. As described herein, user device 110 (and/or an input component of user device 110) may be used to detect, analyze, and/or perform one or more operations associated with verification of a user input of a user interface.

Similar to user device 110, wireless communication device 120 includes one or more devices capable of receiving, generating, storing, processing, and/or providing information associated with one or more sensors described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), an ATM machine, a payment terminal, a kiosk, an interactive display device, or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G (New Radio) network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, network 130 may include a data network and/or be communicatively with a data platform (e.g., a web-platform, a cloud-based platform, a non-cloud-based platform, and/or the like) that is capable of receiving, generating, processing, and/or providing information associated with verification of a user input of a user interface detected and/or analyzed by user device 110.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
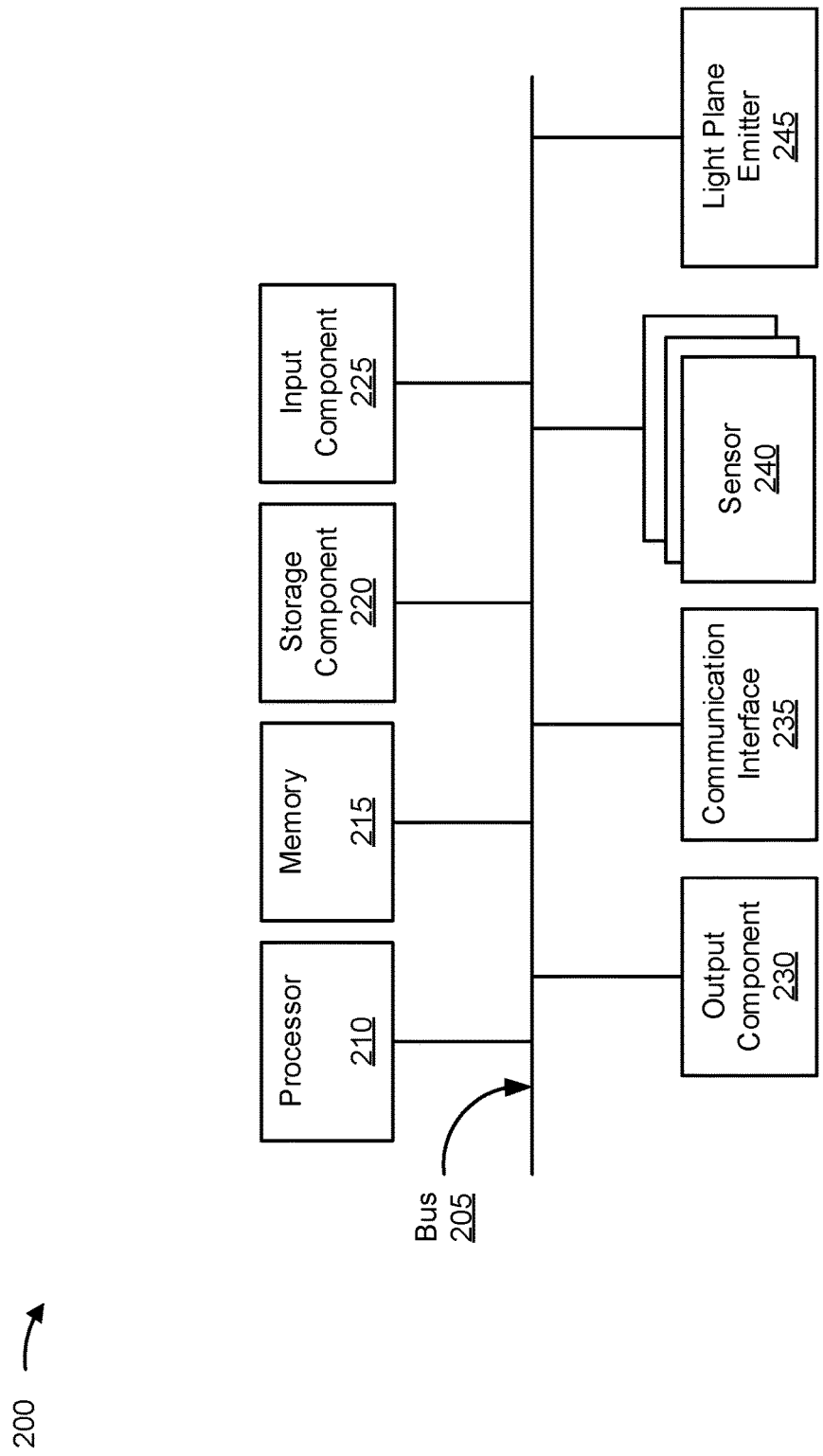
FIG. 2 is a diagram illustrating example components of one or more devices shown in FIG. 1, such as a user device and/or a wireless communication device, in accordance with the present disclosure.

FIG. 2 is a diagram illustrating example components of a device 200, in accordance with the present disclosure. Device 200 may correspond to user device 110 and/or wireless communication device 120. In some aspects, user device 110 and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, and/or a light plane emitter 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

Sensor 240 may include an optical sensor that has a field of view in which sensor 240 may determine one or more characteristics of an environment of device 200. In some aspects, sensor 240 may include a camera. For example, sensor 240 may include a low-resolution camera (e.g., a video graphics array (VGA)) that is capable of capturing images that are less than one megapixel, images that are less than 1216×912 pixels, and/or the like. Sensor 240 may be a low-power device (e.g., a device that consumes less than ten milliwatts (mW) of power) that has an always-on capability (e.g., to permit always-on facial detection, always-on character recognition, always-on object detection, and/or the like) while device 200 is powered on.

Additionally, or alternatively, sensor 240 may include a light sensor (e.g., a complementary metal oxide semiconductor (CMOS) sensor, a charge coupled device (CCD) sensor, and/or the like), magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a global navigation satellite system (GNSS) component, a local positioning system (LPS) device (e.g., that uses triangulation and/or multi-lateration, among other examples), and/or the like), a gyroscope (e.g., a micro-electro-mechanical system (MEMS) gyroscope or a similar type of device), an accelerometer, a speed sensor, a motion sensor, an infrared sensor, a temperature sensor, a pressure sensor, and/or the like.

Light plane emitter 245 includes a light emitting component that enables device 200 to emit a plane of light substantially parallel to a surface of an input component to cause the light to be reflected toward sensor 240 for sensing. For example, light plane emitter 245 may include an infrared spectrum emitter (e.g., a light emitting diode (LED)) associated with a transmit power that satisfies a threshold (e.g., a visibility threshold, a safety threshold, and/or the like). In some aspects, light plane emitter 245 may be optically coupled to a light guide to direct the plane of light across the surface of the input component.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for causing a light emitter to emit light waves within a light plane that is parallel to a surface of an input component; means for receiving, from a sensor arrangement, a measurement associated with the light waves in the light plane, wherein the measurement is indicative of an intended input of a user; means for performing an action that is associated with a user input of the input component based at least in part on the intended input; or the like. In some aspects, such means may include one or more components of device 200 described in connection with FIG. 2, such as bus 205, processor 210, memory 215, storage component 220, input component 225, output component 230, communication interface 235, sensor 240, and/or light emitter plane 245.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
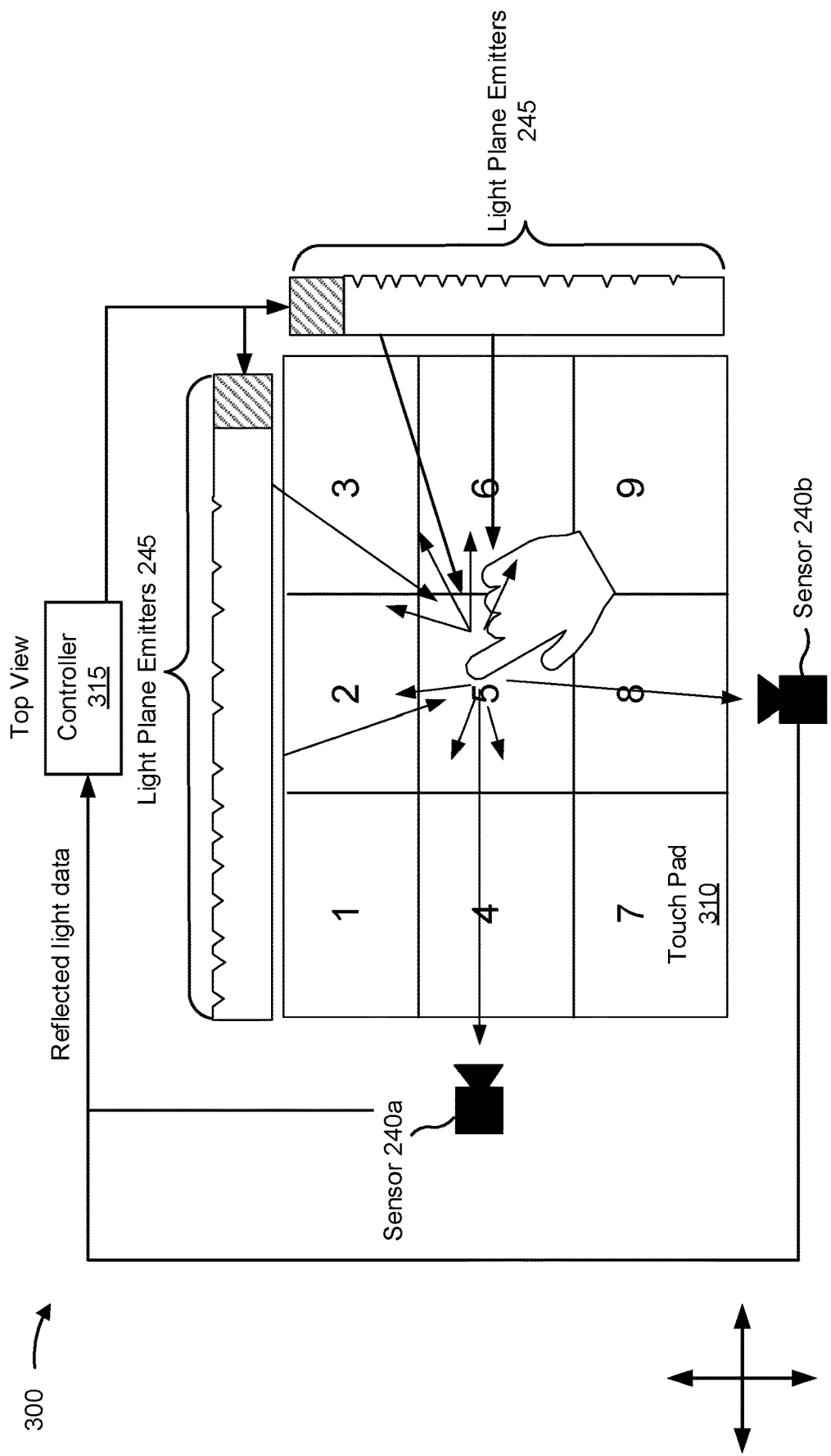
FIGS. 3A-3B and 4-5 are diagrams illustrating examples associated with verification of a user input of a user interface, in accordance with the present disclosure.
Figure 3B:
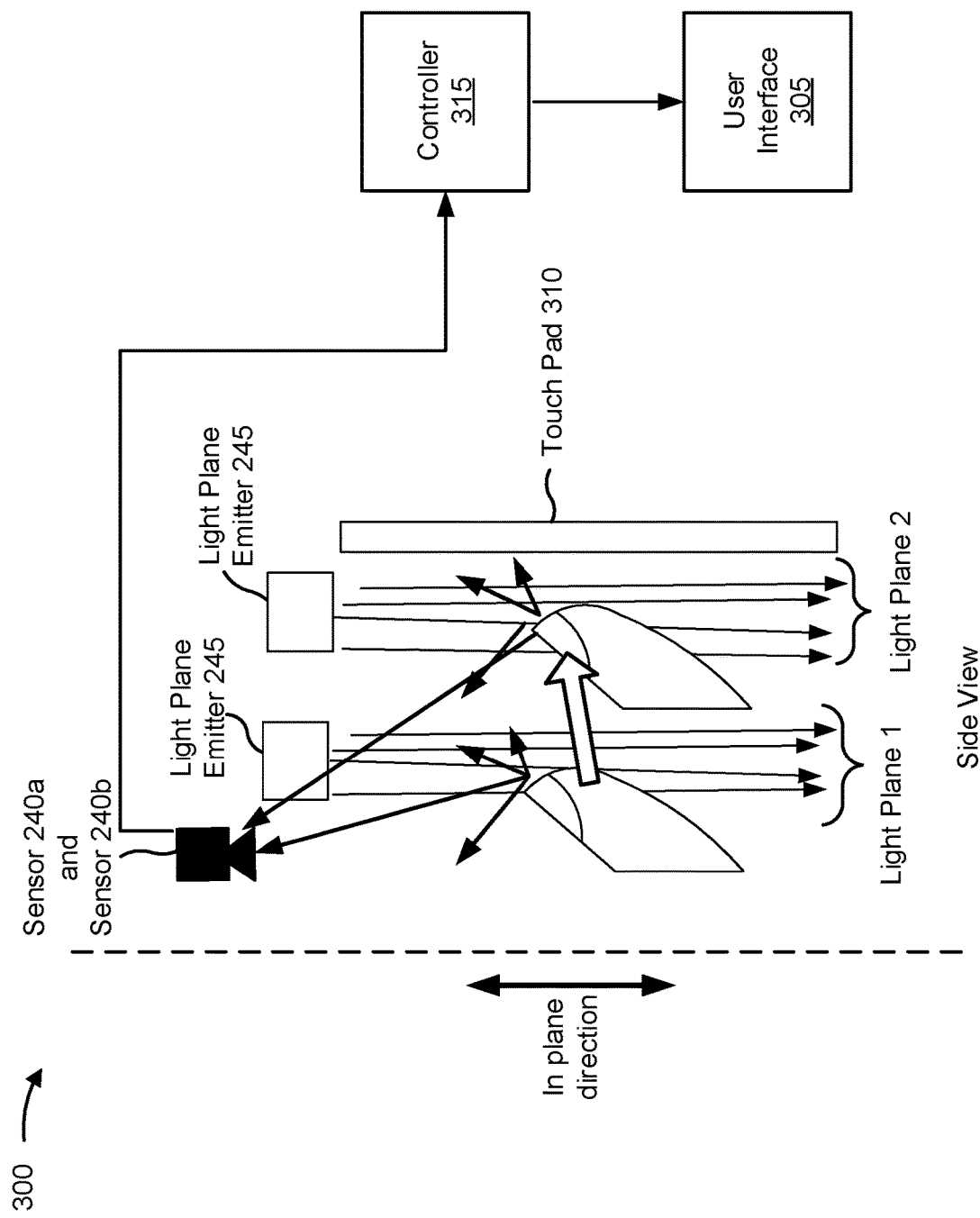

FIGS. 3A-3B are diagrams illustrating an example 300 associated with verification of a user input of a user interface, in accordance with the present disclosure. As shown in FIGS. 3A-3B, example 300 includes a user interface 305 (e.g., a touch pad 310, as shown in FIG. 3A) of a user device 110 is associated with one or more sensors 240 (e.g., sensor 240a and/or sensor 240b, as shown) and a controller 315 (e.g., processor 210) configured to detect an input based at least in part on a location at which an object (e.g., a finger of a user) penetrates a plane of light (e.g., a light plane) emitted by one or more light plane emitters 245.

In some aspects, the controller 315 causes the light plane emitters 245 to generate light planes. For example, the controller 315 may provide a signal to the light plane emitters 245 to cause the light plane emitters 245 to generate light planes based at least in part on the user interface 305 transitioning from an inactive state to an active state. A light plane may be formed by a sheet of light emitted by a light plane emitter 245 along a plane that is parallel to a surface of an input component (e.g., the touch pad 310). In some aspects, the controller 315 causes the light plane emitters 245 to generate the light planes as described below with respect to FIGS. 4-5.

In some aspects, the controller 315 causes a plurality of light plane emitters 245 to generate respective light planes to form a plurality of layers of light planes extending over the surface of the input component. For example, a first light plane emitter 245 may be positioned adjacent to the surface of the input component to cause the first light plane emitter to generate a first light plane a first distance from the surface of the input component. A second light plane emitter 245 may be stacked on top of and/or positioned above the first light plane emitter 245 to cause the second light plane emitter 245 to generate a second light plane a second distance from the surface of the input component. The second distance may be greater than the first distance. In some aspects, a frequency and/or a color of the second light plane may be different from a frequency and/or a color of the first light plane.

In some aspects, a distance between the first light plane and the second light plane may be about the same as the first distance. For example, the second light plane emitter 245 may be positioned directly on top of the first light plane emitter to cause the distance between the first light plane and the second light plane to be about the same as the first distance.

In some aspects, the distance between the first light plane and the second light plane may be different from the first distance. For example, the second light plane emitter 245 may be positioned over the first light plane emitter 245 (e.g., on top of a spacer or a similar type of structure that is positioned on top of the first plane emitter 245), may be configured differently than the first light plane emitter 245, may be a different size than the first light plane emitter 245, and/or the like to cause the distance between the first light plane and the second light plane to be different from the first distance.

A distance of the light plane from the surface of the input component may be based at least in part on a size and/or a physical configuration of the input component. In some aspects, a distance of the light plane from the surface of the input component may be a first distance based at least in part on the input component having a first surface area. The distance of the light plane from the surface of the input component may be a second distance based at least in part on the input component having a second surface area that is greater than the first surface area. In some aspects, the first distance is greater than the second distance based at least in part on the second surface area being greater than the first surface area.

In some aspects, the controller 315 monitors, via sensors 240 (e.g., sensor 240a and/or sensor 240b, as shown in FIG. 3A), the light planes. For example, as shown in FIG. 3A, the input component may display a virtual key pad and a user may move a finger (or another type of object, such as a stylus) towards the surface of the input component to input a number (e.g., the number 5, as shown) via the virtual key pad. As the user's finger penetrates the light plane, light may be reflected by the user's finger. A portion of the reflected light may be received by the sensor 240a and/or the sensor 240b. The sensor 240a and/or the sensor 240b may provide information associated with the reflected light to the controller 315. The controller 315 may monitor the light planes based on the information provided by the sensor 240a and/or the sensor 240b.

In some aspects, the sensor 240a and the sensor 240b each include an image sensor that is configured to identify a source (e.g., the user's finger) of reflected light within the light plane. In some aspects, the image sensor is a low-resolution (e.g., less than one megapixel), low-power (e.g., consumes less than 10 mW) sensor that enables an always-on detection capability (e.g., always-on object detection) while the input component is powered on. For example, the image sensor may include a low-resolution camera (e.g., a VGA) that is capable of capturing images that are less than one megapixel, images that are less than 1216×912 pixels, and/or the like.

The image sensor may generate an image based at least in part on receiving the reflected light. The information associated with the reflected light may include the image generated by the image sensor, information identifying the sensor device associated with the image sensor (e.g., the sensor 240a or the sensor 240b), information identifying a time associated with generating the image and/or receiving the reflected light, and/or the like. In some aspects, the information associated with the reflected light may include information associated with a portion of the light plane blocked by the finger, as described in greater detail below with respect to FIG. 4.

In some aspects, the controller 315 determines the intended input based on the reflected light caused by the user penetrating the first light plane (e.g., light plane 1, as shown in FIG. 3B). The intended input may correspond to an input associated with a position and/or trajectory associated with the user's finger penetrating the first light plane. In some aspects, the controller 315 determines the intended input based on a location of a source of the reflected light (e.g., the user's finger) with respect to the surface of the input component.

The controller 315 may determine the location of the source of the reflected light based on the information associated with the reflected light received from the sensor 240a and/or the sensor 240b. In some aspects, the information associated with the reflected light includes images generated by the sensor 240a and the sensor 240b. The controller 315 may perform an object detection process to detect the source of the reflected light (e.g., the user's finger) within the images and/or a location of the source of the reflected light within the images (e.g., a bounding box that includes the user's finger).

In some aspects, the controller 315 determines a location of the sensor 240a and/or the sensor 240b based on the information associated with the reflected light. For example, the information associated with the reflected light includes information identifying the sensor 240a and/or the sensor 240b, and/or a location of the sensor 240a and/or the sensor 240b relative to the surface of the input component and/or the light plane. Alternatively, and/or additionally, the controller 315 may determine the location of the sensor 240a and/or the sensor 240b based on accessing a data structure (e.g., a database, a table, a list, and/or the like) storing information indicating the location of the sensor 240a and/or the sensor 240b.

Alternatively, and/or additionally, the information associated with the reflected light identifies an amount of time associated with the sensor 240a and/or the sensor 240b receiving the reflected light. For example, the information associated with the reflected light may identify a time at which a light wave was emitted by the light plane emitters 245 and/or a time at which the reflected light was received at the sensor 240a and/or the sensor 240b. The controller 315 may determine a distance of the source of the reflected light from the sensor 240a and/or the sensor 240b based on the amount of time associated with the sensor 240a and/or the sensor 240b receiving the reflected light.

The controller 315 may perform a triangularization process to determine the location of the source of the reflected light with respect to the surface of the input component based on the location of the sensor 240a, the location of the sensor 240b, the distance of the source of the reflected light from the sensor 240a and/or the sensor 240b, and/or the position of the source of the reflected light within the images generated by the sensor 240a and/or the sensor 240b. The controller 315 may identify an input element, of the input component, that is associated with the location of the source of the reflected light.

In some aspects, the controller 315 determines an input element, of the input component, that is positioned within a threshold distance of the location of the source of the reflected light. The controller 315 may cause an output component to indicate that the input element is to be used to provide the user input (e.g., to indicate that the input element is the intended input based on the location and/or trajectory at which the user's finger penetrated the first light plane). For example, the location of the source of the reflected light may be within a threshold distance of a key on a virtual keyboard. The controller 315 may cause the key to be illuminated to indicate that the key is to be selected as the user input. By causing the output component to indicate that the input element is the intended input, the user device 110 may enable the user to adjust the movement of the user's finger if the intended input is not the input desired to be selected by the user.

As shown in FIG. 3B, the user's finger may continue to move towards the surface of the input component and may penetrate a second light plane (e.g., light plane 2, as shown). In some aspects, the controller 315 causes a second light plane emitter 245 to emit light waves within a second light plane that is parallel to the surface of the input component. In some aspects, the controller 315 causes the second light plane emitter 245 to emit the light waves within the second plane of light based on the user's finger penetrating the first plane of light. In some aspects, a frequency and/or a color of the light waves emitted by the second light plane emitter 245 may be different from a frequency and/or a color of the light waves emitted by the first light plane emitter 245.

In some aspects, the controller 315 determines a selected input based on reflected light from the user's finger penetrating the second light plane. The selected input may correspond to an input associated with a position and/or trajectory at which the user's finger penetrates the second light plane. In some aspects, the controller 315 may determine the selected input in a manner similar to that described above with respect to determining the intended input. In some aspects, the controller 315 determines an input element, of the input component, that is positioned within a threshold distance of the location of the source of the reflected light of the second light sheet and the controller 315 may cause an output component to indicate that the input element is to be used to provide the user input or has provided the user input, in a manner similar to that described above. In some aspects, the output component may provide an indication that is different from an indication provided with respect to the intended input. For example, a size of the input element may change, the input element may be illuminated in a first color, with a first brightness, and/or the like to indicate the intended input and may be illuminated in a second, different color, brightness, and/or the like to indicate the selected input.

In some aspects, the controller 315 determines and/or verifies the user input according to the intended input and/or the selected input. The controller 315 may perform an action to verify that the user input is associated with the selected input based at least in part on a location of the source of reflected light within the first light plane and a location of the source of reflected light within the second light plane. For example, the controller 315 may determine whether the location of the source of reflected light within the first light plane and the location of the source of reflected light within the second light plane are substantially the same (e.g., within a threshold distance). The controller 315 may determine and/or verify the selected input of the user when the location of the source of reflected light within the first light plane and the location of the source of reflected light within the second light plane are substantially the same.

In some aspects, the controller 315 controls the user interface according to the user input. For example, the controller 315 may cause a device associated with the input component (e.g., user device 110) to perform an action associated with the user input based on determining and/or verifying the selected input of the user.

In some aspects, the controller 315 may not determine and/or verify the selected input of the user. For example, the controller 315 may not determine and/or verify the selected input of the user when the location of the source of reflected light within the first light plane and the location of the source of reflected light within the second light plane are not substantially the same. The controller 315 may determine not to control the user interface according to the input and/or may provide a notification to the user based at least in part on the controller 315 not determining and/or verifying the selected input of the user.

As indicated above, FIGS. 3A-3B are provided as an example. Other examples may differ from what is described with respect to FIGS. 3A-3B.

Figure 4:
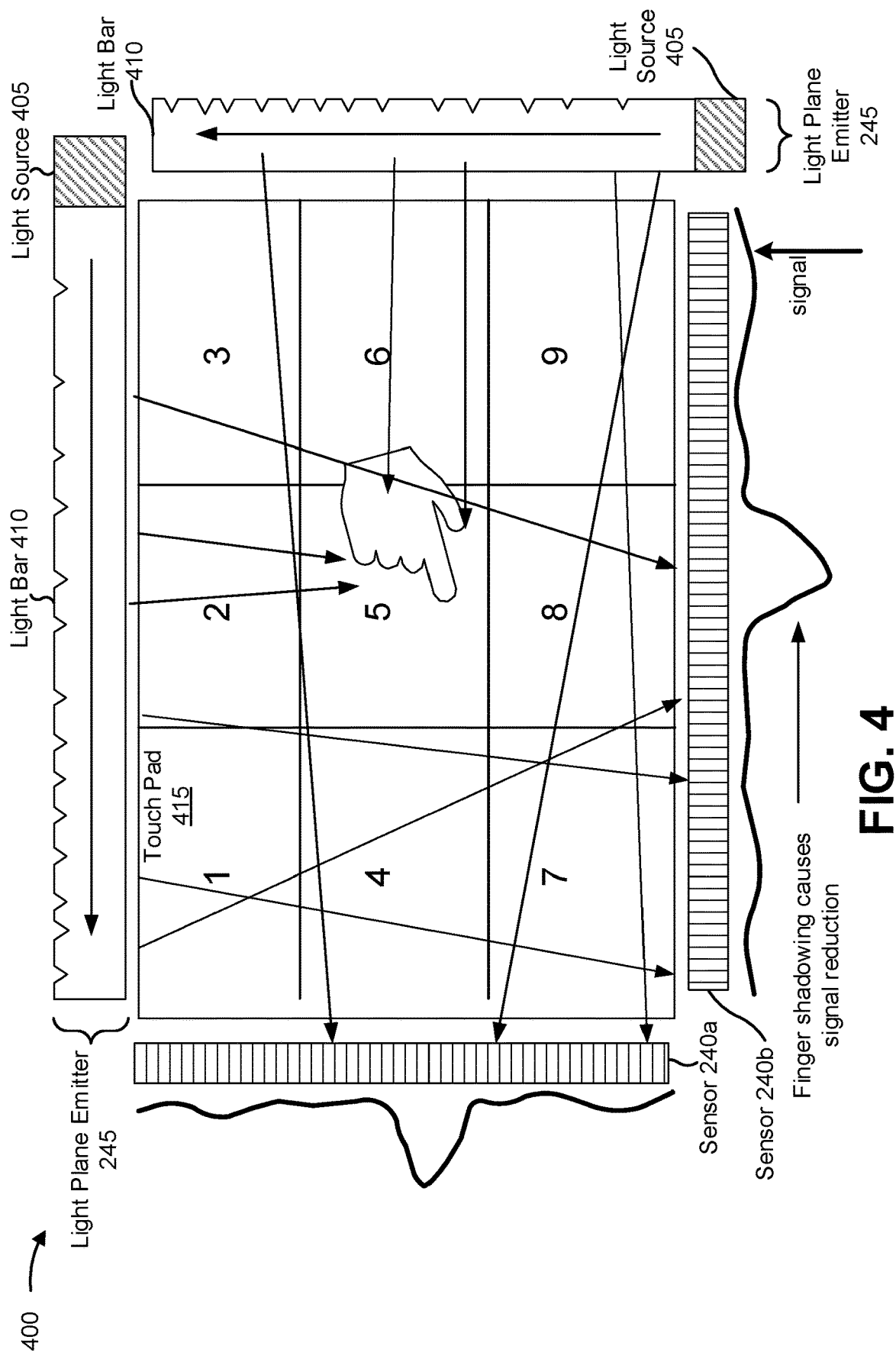

FIG. 4 is a diagram illustrating an example 400 associated with verification of a user input of a user interface, in accordance with the present disclosure. As shown in FIG. 4, example 400 includes a user interface (e.g., a touch pad 415, as shown) of a user device 110 associated with sensors 240 and light plane emitters 245.

In some aspects, a light plane emitter 245 includes a light source 405 and a light bar 410. The light source 405 may include one or more devices configured to emit light. For example, the light source 405 may include an LED, a vertical-cavity surface-emitting laser (VCSEL), and/or like.

The light bar 410 may include one or more devices configured to receive the collimated light and to emit light waves to form a light plane parallel to a surface of a user interface. In some aspects, the light bar 410 includes one or more turning features. In some aspects, the one or more turning features include a facet. The facet may include a trough formed in the light bar 410. The trough may be aligned in the out-of-plane direction (e.g., orthogonal to the surface of the user interface). Light propagating through the light bar 410 may strike the facet and may be internally reflected out of the light bar 410 to form a sheet of light (e.g., a light plane) in the in-plane direction.

In some aspects, the sensors 240 include a set of light sensor elements arranged opposite to the light plane emitters 245. For example, the light plane emitter 245 may be positioned on a first side of the user interface and the set of light sensor elements may be positioned on a second side of the user interface that is opposite the first side of the user interface. The controller (e.g., controller 315, shown in FIGS. 3A and 3B) may cause the light plane emitter 245 to emit light waves within a light plane. The light plane may be parallel to a surface of the user interface. The set of light sensor elements may receive the light waves emitted by the light plane emitter 245. The set of light sensor elements may generate a signal based at least in part on receiving the light waves emitted by the light plane emitter 245. The signal may indicate whether a light sensor element, of the set of light sensor elements, received light waves emitted by the light plane emitter 245.

In some aspects, each portion of the generated signal is associated with a respective light sensor element. For example, a first portion of the signal may be transmitted from a first time until a second time and may be associated with a first light sensor element, and a second portion of the signal may be transmitted from the second time to a third time and may be associated with a second light sensor element. A value (e.g., a voltage, a current, and/or the like) of the first portion of the signal may indicate an amount of emitted light waves received by the first light sensor element and a value of the second portion of the signal may indicate an amount of emitted light waves received by the second light sensor element.

The set of light sensor elements may periodically (e.g., every 0.1 seconds, every 0.5 seconds, and/or the like) provide the signal to the controller. Alternatively, and/or additionally, the set of light sensor elements may provide the signal to the controller based at least in part on a change to a value of a portion of the signal.

For example, as shown in FIG. 4, a user may move a finger towards the surface of the user interface and may penetrate one or more light planes generated by one or more light plane emitters 245. The user's finger may prevent light waves emitted by a light plane emitter 245 from being received by one or more light sensor elements of a set of light sensor elements. A light sensor element, of the one or more light sensor elements, may indicate the intended input based at least in part on the light sensor element sensing that an object within the light plane is preventing one or more of the light waves emitted by the light plane emitter 245 from reaching the light sensor element. For example, a value of a portion of the signal corresponding to the light sensor element may be reduced based at least in part on the light sensor element sensing that the object within the light plane is preventing one or more of the light waves emitted by the light plane emitter 245 from reaching the light sensor element.

The controller may receive the signal and may identify the light sensor element based on the value of the portion of the signal. In some aspects, the controller may determine that the value of the portion of the signal satisfies a threshold and the controller identifies the light sensor element based on the value of the portion of the signal satisfying the threshold. Alternatively, and/or additionally, the controller may identify the light sensor element based at least in part on the value of the portion of the signal being less than a value of another portion of the signal by at least a threshold amount.

The controller may determine a position of the object based on a position of the light sensor element. For example, the controller may determine the position of the light sensor element relative to a center of the user interface, a lower left corner of the user interface, and/or the like based on accessing a data structure storing information indicating positions of the light sensor elements.

In some aspects, the information indicating positions of the light sensor elements includes information identifying an input element positioned between a light sensor element and the light plane emitter 245. In some aspects, the set of light sensor elements may be positioned along an axis (e.g., an x-axis) of a coordinate system and the information indicating the position of a light sensor element may include a coordinate of the axis (e.g., an x-axis coordinate).

In some aspects, the user's finger may prevent light emitted from another light plane emitter from reaching another light sensor element of another set of light sensor elements. The controller may identify the other light sensor element and a location of the other light sensor element based at least in part on a signal transmitted to the controller by the other set of light sensor elements in a manner similar to that described above. The controller may determine the location of the user's finger based on the location of the light sensor element and the location of the other light sensor element.

For example, the other set of light sensor elements may be positioned along another axis (e.g., a y-axis) of the coordinate system. The information indicating the position of the other light sensor element may include a coordinate of the other axis (e.g., a y-axis coordinate). The controller may determine the location of the user's finger based on the coordinate of the axis and the coordinate of the other axis.

As indicated above, FIG. 4 is provided as an example. Other examples may differ from what is described with respect to FIG. 4.

Figure 5:
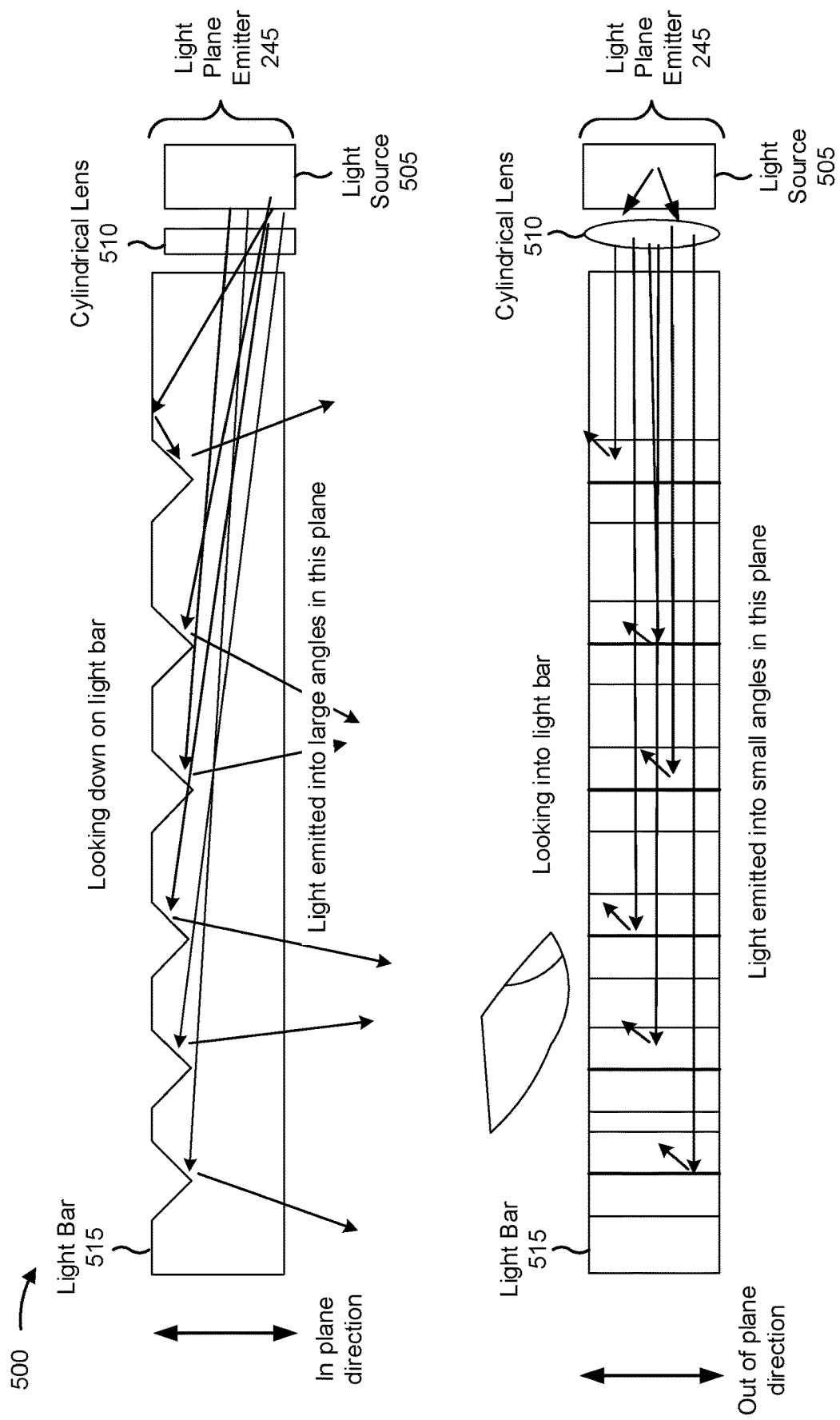

FIG. 5 is a diagram illustrating an example 500 associated with verification of a user input of a user interface, in accordance with the present disclosure. As shown in FIG. 5, example 500 includes a light plane emitter 245 including a light source 505, a lens 510, and a light bar 515. The light source 505 may include one or more devices configured to emit light. For example, the light source 505 may include an LED, a VCSEL, and/or like.

The lens 510 may be configured to collimate light from the light source 505 along an axis. In some aspect, the lens 510 comprises a cylindrical lens. The cylindrical lens may be oriented to collimate light in an out-of-plane direction (e.g., a direction orthogonal to the surface of the user interface) and/or to not collimate light in an in-plane direction (e.g., a direction that is parallel to the surface of the user interface).

In some aspects, the lens 510 may comprise a spherical lens. The spherical lens may collimate light in a direction along an axis of a coordinate system (e.g., an x-axis or a y-axis). In some aspects, the collimated light is edge coupled into the light bar 515.

The light bar 515 may include one or more devices configured to receive the collimated light and to emit light waves to form a light plane parallel to a surface of a user interface. In some aspects, the light bar 515 includes one or more turning features. In some aspects, the one or more turning features include a facet. The facet may include a trough formed in the light bar 515. The trough may be aligned in the out-of-plane direction (e.g., orthogonal to the surface of the user interface). Light propagating through the light bar 515 may strike the facet and may be internally reflected out of the light bar 515. Because the light is collimated in the out-of-plane direction, the light reflected out of the light bar 515 may form a sheet of light (e.g., a light plane) in the in-plane direction.

In some aspects, the light bar 515 is tapered. The lens 510 may be a spherical lens and the light bar 515 may be tapered to cause all of the light propagating through the light bar 515 to strike a facet of the light bar.

As indicated above, FIG. 5 is provided as an example. Other examples may differ from what is described with respect to FIG. 5.

Figure 6:
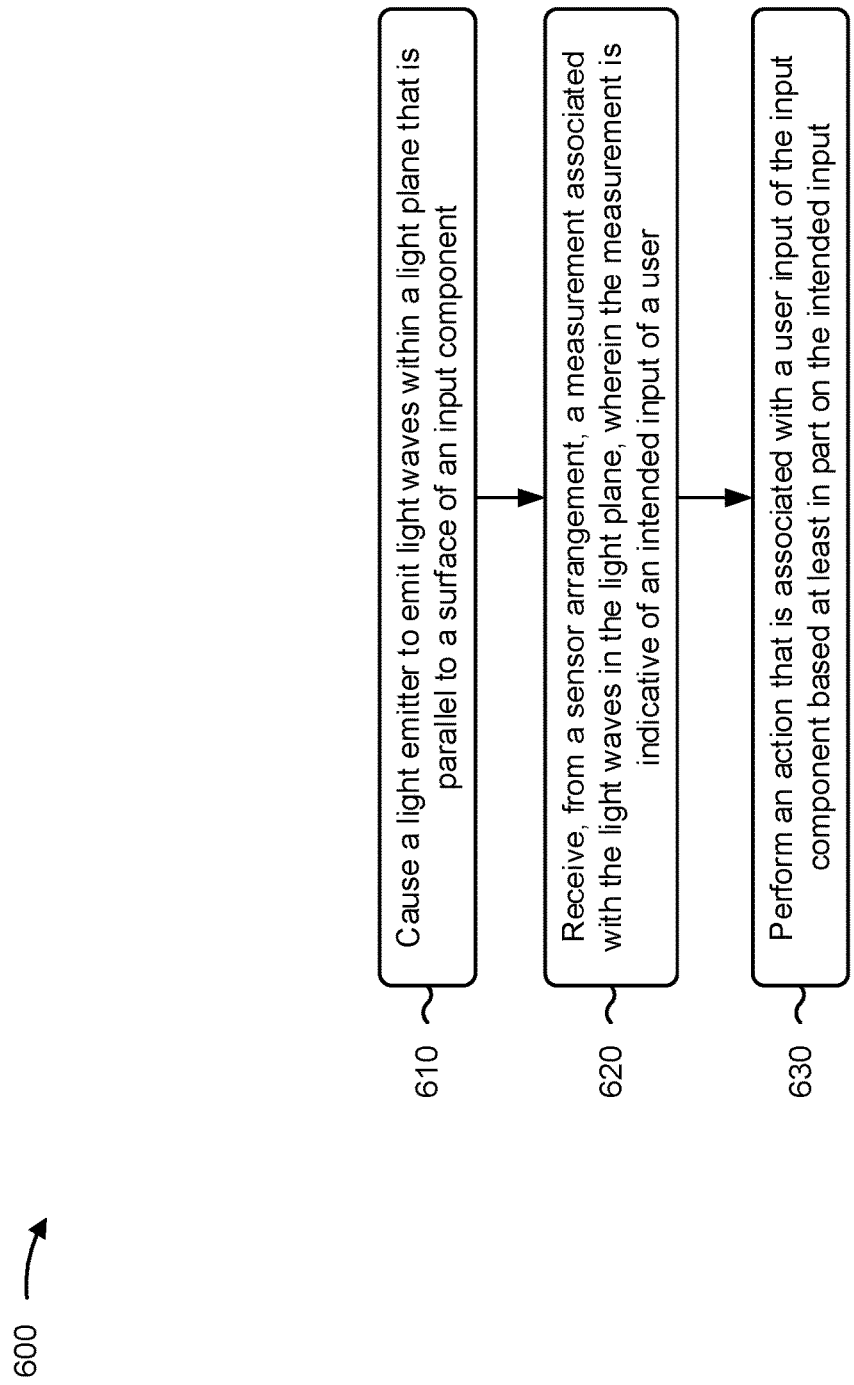
FIG. 6 is a flowchart of an example process associated with verification of a user input of a user interface, in accordance with the present disclosure.

FIG. 6 is a diagram illustrating an example process 600 performed, for example, by a device, in accordance with the present disclosure. Example process 600 is an example where the device (e.g., user device 110 and/or wireless communication device 120) performs operations associated with verification of a user input of a user interface.

As shown in FIG. 6, in some aspects, process 600 may include causing a light emitter to emit light waves within a light plane that is parallel to a surface of an input component (block 610). For example, the device (e.g., using processor 210, memory 215, storage component 220, input component 225, output component 230, communication interface 235, sensor 240, light plane emitter 245, and/or the like) may cause a light emitter to emit light waves within a light plane that is parallel to a surface of an input component, as described above.

As further shown in FIG. 6, in some aspects, process 600 may include receiving, from a sensor arrangement, a measurement associated with the light waves in the light plane, wherein the measurement is indicative of an intended input of a user (block 620). For example, the device (e.g., using processor 210, memory 215, storage component 220, input component 225, output component 230, communication interface 235, sensor 240, light plane emitter 245, and/or the like) may receive, from a sensor arrangement, a measurement associated with the light waves in the light plane, wherein the measurement is indicative of an intended input of a user, as described above. In some aspects, the measurement is indicative of an intended input of a user.

As further shown in FIG. 6, in some aspects, process 600 may include performing an action that is associated with a user input of the input component based at least in part on the intended input (block 630). For example, the device (e.g., using processor 210, memory 215, storage component 220, input component 225, output component 230, communication interface 235, sensor 240, light plane emitter 245, and/or the like) may perform an action that is associated with a user input of the input component based at least in part on the intended input, as described above.

Process 600 may include additional aspects, such as any single aspect or any combination of aspects described below and/or in connection with one or more other processes described elsewhere herein.

In a first aspect, the sensor arrangement comprises one or more image sensors that are configured to identify a source of reflected light within the light plane, wherein the intended input is determined from a location of the source of the reflected light relative to the input component.

In a second aspect, alone or in combination with the first aspect, the sensor arrangement comprises a first image sensor and a second image sensor, wherein the first image sensor and the second image sensor are configured to identify a source of reflected light within the light plane, wherein the measurement indicates a location of the reflected light based at least in part on a position of the first image sensor, a position of the second image sensor, and a position of the light emitter, wherein the intended input is determined from the location of the reflected light.

In a third aspect, alone or in combination with one or more of the first and second aspects, the light emitter is positioned on a first side of the input component, and the sensor arrangement comprises a set of light sensor elements arranged on a second side of the input component that is opposite the first side, wherein a light sensor element of the set of light sensor elements indicates the intended input based at least in part on the light sensor element sensing that an object within the light plane is preventing one or more of the light waves from reaching the light sensor element.

In a fourth aspect, alone or in combination with one or more of the first through third aspects, process 600 includes causing another light emitter to emit other light waves within another light plane that is parallel to the surface of the input component, and receiving, from the sensor arrangement, another measurement associated with the other light plane, wherein the other measurement is indicative of a selected input of the user, and wherein the action is performed to verify that the user input is associated with the selected input based at least in part on a location of a source of reflected light within the light plane and a location of a source of other reflected light within the other light plane.

In a fifth aspect, alone or in combination with one or more of the first through fourth aspects, the action is performed based at least in part on a location of a source of reflected light from the light plane, wherein the location of the source of the reflected light is indicative of the intended input based at least in part on a physical configuration of the input component.

In a sixth aspect, alone or in combination with one or more of the first through fifth aspects, performing the action comprises determining a location of a source of reflected light from the light plane, determining an input element, of the input component, that is positioned within a threshold distance of the location, and causing an output component to indicate that the input element is to be used to provide the user input or has provided the user input, wherein the output component and the input component are associated with a same user interface.

In a seventh aspect, alone or in combination with one or more of the first through sixth aspects, performing the action comprises determining a location of a source of reflected light from the light plane, identifying a selected input element of the input component, and verifying the user input based at least in part on the selected input element being within a threshold distance of the location of the source.

In an eighth aspect, alone or in combination with one or more of the first through seventh aspects, the light waves comprise infrared light waves.

In a ninth aspect, alone or in combination with one or more of the first through eighth aspects, a distance between the light plane and the surface of the input component is based at least in part on dimensions of the surface of the input component.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method comprising: causing, by a device, a light emitter to emit light waves within a light plane that is parallel to a surface of an input component; receiving, by the device and from a sensor arrangement, a measurement associated with the light waves in the light plane, wherein the measurement is indicative of an intended input of a user; and performing, by the device, an action that is associated with a user input of the input component based at least in part on the intended input.

Aspect 2: The method of Aspect 1, wherein the sensor arrangement comprises: one or more image sensors that are configured to identify a source of reflected light within the light plane, wherein the intended input is determined from a location of the source of the reflected light relative to the input component.

Aspect 3: The method of any of Aspects 1 through 2, wherein the sensor arrangement comprises: a first image sensor; and a second image sensor, wherein the first image sensor and the second image sensor are configured to identify a source of reflected light within the light plane, wherein the measurement indicates a location of the reflected light based at least in part on a position of the first image sensor, a position of the second image sensor, and a position of the light emitter, wherein the intended input is determined from the location of the reflected light.

Aspect 4: The method of any of Aspects 1 through 3, wherein the light emitter is positioned on a first side of the input component, and wherein the sensor arrangement comprises a set of light sensor elements arranged on a second side of the input component that is opposite the first side, wherein a light sensor element of the set of light sensor elements indicates the intended input based at least in part on the light sensor element sensing that an object within the light plane is preventing one or more of the light waves from reaching the light sensor element.

Aspect 5: The method of any of Aspects 1 through 4, further comprising: causing another light emitter to emit other light waves within another light plane that is parallel to the surface of the input component; and receiving, from the sensor arrangement, another measurement associated with the other light plane, wherein the other measurement is indicative of a selected input of the user, and wherein the action is performed to verify that the user input is associated with the selected input based at least in part on a location of a source of reflected light within the light plane and a location of a source of other reflected light within the other light plane.

Aspect 6: The method of any of Aspects 1 through 5, wherein the action is performed based at least in part on a location of a source of reflected light from the light plane, wherein the location of the source of the reflected light is indicative of the intended input based at least in part on a physical configuration of the input component.

Aspect 7: The method of any of Aspects 1 through 6, wherein performing the action comprises: determining a location of a source of reflected light from the light plane; determining an input element, of the input component, that is positioned within a threshold distance of the location; and causing an output component to indicate that the input element is to be used to provide the user input or has provided the user input, wherein the output component and the input component are associated with a same user interface.

Aspect 8: The method of any of Aspects 1 through 7, wherein performing the action comprises: determining a location of a source of reflected light from the light plane; identifying a selected input element of the input component; and verifying the user input based at least in part on the selected input element being within a threshold distance of the location of the source.

Aspect 9: The method of any of Aspects 1 through 8, wherein the light waves comprise infrared light waves.

Aspect 10: The method of any of Aspects 1 through 9, wherein a distance between the light plane and the surface of the input component is based at least in part on dimensions of the surface of the input component.

Aspect 11: An apparatus for wireless communication at a device, comprising a processor; memory coupled with the processor; and instructions stored in the memory and executable by the processor to cause the apparatus to perform the method of one or more Aspects of Aspects 1 through 10.

Aspect 12: A device for wireless communication, comprising a memory and one or more processors coupled to the memory, the memory and the one or more processors configured to perform the method of one or more Aspects of Aspects 1 through 10.

Aspect 13: An apparatus for wireless communication, comprising at least one means for performing the method of one or more Aspects of Aspects 1 through 10.

Aspect 14: A non-transitory computer-readable medium storing code for wireless communication, the code comprising instructions executable by a processor to perform the method of one or more Aspects of Aspects 1 through 10.

Aspect 15: A non-transitory computer-readable medium storing a set of instructions for wireless communication, the set of instructions comprising one or more instructions that, when executed by one or more processors of a device, cause the device to perform the method of one or more Aspects of Aspects 1 through 10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
    causing, by a device, one or more light emitters to emit first light waves within a first light plane and second light waves within a second light plane,
        wherein the first light plane and the second light plane are parallel to and over a surface of an input component, and
        wherein the input component is a user interface;
    identifying, by the device and using one or more sensors, first information associated with first reflected light reflected by a finger as the finger penetrates one or more of the first light waves within the first light plane and second information associated with second reflected light reflected by the finger as the finger penetrates one or more of the second light waves within the second light plane,
        wherein the one or more sensors include a sensor that is on a side of the input component in a lateral direction from the input component; and
    performing, by the device, based on the first information and the second information, and without requiring a user to physically contact the input component, an action to verify that a user input is associated with a selected input when a location of the finger within the first light plane and a location of the finger within the second light plane are within a threshold distance.

2. The method of claim 1, wherein the one or more sensors are one or more image sensors.

3. The method of claim 1,
    wherein the sensor includes a first image sensor, and
    wherein the one or more sensors further include a second image sensor that is on a different side of the input component.

4. The method of claim 1,
    wherein the one or more light emitters include a light emitter positioned on a first side of the input component,
    wherein the one or more sensors include a set of light sensor elements arranged on a second side of the input component that is opposite the first side, and
    wherein the second side is the side of the input component.

5. The method of claim 1, wherein the location of the finger within the first light plane is indicative of an intended input based at least in part on a physical configuration of the input component, and
    wherein the user input is the intended input.

6. The method of claim 1, further comprising:
    determining an input element, of the input component, based on the location of the finger within the first light plane; and
    causing an output component to indicate that the input element is to be used to provide the user input based on a trajectory at which the first light plane was penetrated.

7. The method of claim 1, wherein performing the action comprises:
    determining, based on the first information, the location of the finger within the first light plane.

8. The method of claim 1, wherein the first light waves comprise infrared light waves.

9. The method of claim 1, wherein a distance between the first light plane and the surface of the input component is based at least in part on dimensions of the surface of the input component.

10. A device, comprising:
one or more memories; and
one or more processors, coupled to the one or more memories, configured to cause the device to:
cause one or more light emitters to emit first light waves within a first light plane and second light waves within a second light plane,
wherein the first light plane and the second light plane are parallel to a surface of an input component, and
wherein the input component is a touch pad;
identify, using one or more sensors, first information associated with first reflected light reflected by a finger as the finger penetrates one or more of the first light waves within the first light plane and second information associated with second reflected light reflected by the finger as the finger penetrates one or more of the second light waves within the second light plane,
wherein the one or more sensors include a sensor that is on a side of the input component in a horizontal direction from the input component; and
perform, based on the first information and the second information, an action to verify that a user input is associated with a selected input when a location of the finger within the first light plane and a location of the finger within the second light plane are within a threshold distance.

11. The device of claim 10, further comprising:
one or more image sensors,
wherein the one or more sensors are the one or more image sensors.

12. The device of claim 10, further comprising:
a first image sensor; and
a second image sensor,
wherein the one or more sensors include the first image sensor and the second image sensor.

13. The device of claim 10, wherein the location of the finger within the first light plane is indicative of an intended input based at least in part on a physical configuration of the input component, and
wherein the user input is the intended input.

14. The device of claim 10, wherein the one or more processors are further configured to:
cause an output component to indicate that an input element, of the input component, is to be used to provide the user input or has provided the user input.

15. The device of claim 10, wherein, to perform the action, the one or more processors are configured to:
determine, based on the first information, the location of the finger within the first light plane.

16. The device of claim 10,
wherein the one or more light emitters include a first light plane emitter and a second light plane emitter,
wherein, to cause the one or more light emitters to emit the first light waves within the first light plane and the second light waves within the second light plane, the one or more processors are configured to:
cause the first light plane emitter to generate the first light plane over the surface of the input component, and
cause the second light plane emitter to generate the second light plane over the surface of the input component, and
wherein the second light plane emitter is above the first light plane emitter.

17. The device of claim 10, wherein a first frequency of the first light plane is different from a second frequency of the second light plane.

18. The device of claim 10, wherein a first color of the first light plane is different from a second color of the second light plane.

19. The device of claim 10, wherein, to identify the first information and the second information, the one or more processors are configured to cause the device to:
receive the first information and the second information from the one or more sensors.

20. The device of claim 11, wherein the one or more processors are further configured to cause the device to:
cause an output component to indicate that an input element, of the input component, is to be used to provide the user input based on a trajectory at which the finger penetrated the first light plane.

21. A non-transitory computer-readable medium storing a set of instructions, the set of instructions comprising:
one or more instructions that, when executed by one or more processors of a device, cause the device to:
cause one or more light emitters to emit first light waves within a first light plane and second light waves within a second light plane,
wherein the first light plane and the second light plane are parallel to a surface of an input component, and
wherein the input component is a touch pad;
identify, using one or more sensors, first information associated with first reflected light reflected by a finger as the finger penetrates one or more of the first light waves within the first light plane and second information associated with second reflected light reflected by the finger as the finger penetrates one or more of the second light waves within the second light plane,
wherein the one or more sensors include a sensor that is on a side of the input component that is away from the input component along at least one of an x-axis or a y-axis; and
perform, based on the first information and the second information, an action to verify that a user input is associated with a selected input when a location of the finger within the first light plane and a location of the finger within the second light plane are within a threshold distance.

22. The non-transitory computer-readable medium of claim 21, wherein the first information includes information identifying the finger within the first light plane.

23. The non-transitory computer-readable medium of claim 21,
wherein the sensor includes a first image sensor, and
wherein the one or more sensors further include a second image sensor that is on a different side of the input component.

24. The non-transitory computer-readable medium of claim 21,
wherein the location of the finger within the first light plane is indicative of an intended input based at least in part on a physical configuration of the input component, and
wherein the user input is the intended input.

25. The non-transitory computer-readable medium of claim 21, wherein the one or more instructions further cause the device to:
  cause an output component to indicate that an input element, of the input component, is to be used to provide the user input.

26. The non-transitory computer-readable medium of claim 21,
  wherein the first information includes an image generated by the sensor, and
  wherein the location of the finger within the first light plane is within the image.

27. An apparatus, comprising:
  means for causing one or more light emitters to emit first light waves within a first light plane and second light waves within a second light plane,
    wherein the first light plane and the second light plane are parallel to a surface of an input component, and
    wherein the input component is a user interface;
  means for identifying, using one or more sensors, first information associated with first reflected light reflected by a finger as the finger penetrates one or more of the first light waves within the first light plane and second information associated with second reflected light reflected by the finger as the finger penetrates one or more of the second light waves within the second light plane,
    wherein the one or more sensors are positioned on one or more sides of the input component that are away from the input component along at least one of an x-axis or a y-axis; and
  means for performing, based on the first information and the second information, an action to verify that a user input is associated with a selected input when a location of the finger within the first light plane and a location of the finger within the second light plane are within a threshold distance.

28. The apparatus of claim 27, wherein the first information includes information identifying the finger within the first light plane.

29. The apparatus of claim 27, wherein the one or more sensors include a first image sensor and a second image sensor.

30. The apparatus of claim 27, wherein the location of the finger within the first light plane is indicative of an intended input based at least in part on a physical configuration of the input component, and
  wherein the user input is the intended input.

* * * * *